J. J. BARRETT.
TURNING SIGNAL FOR AUTOMOBILES.
APPLICATION FILED FEB. 18, 1915.
1,173,641.
Patented Feb. 29, 1916.
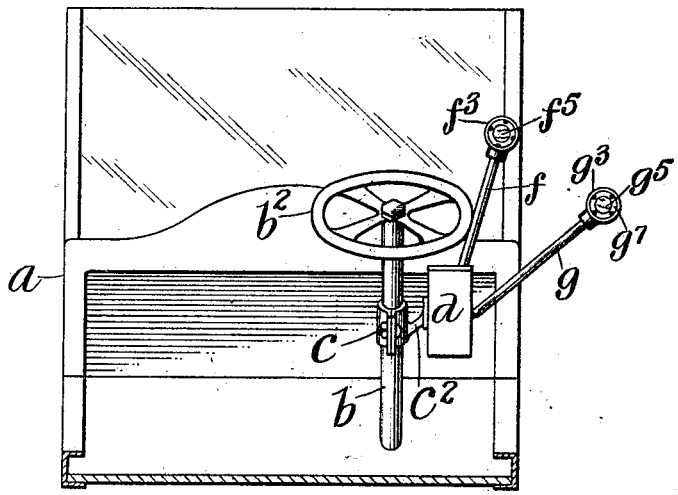
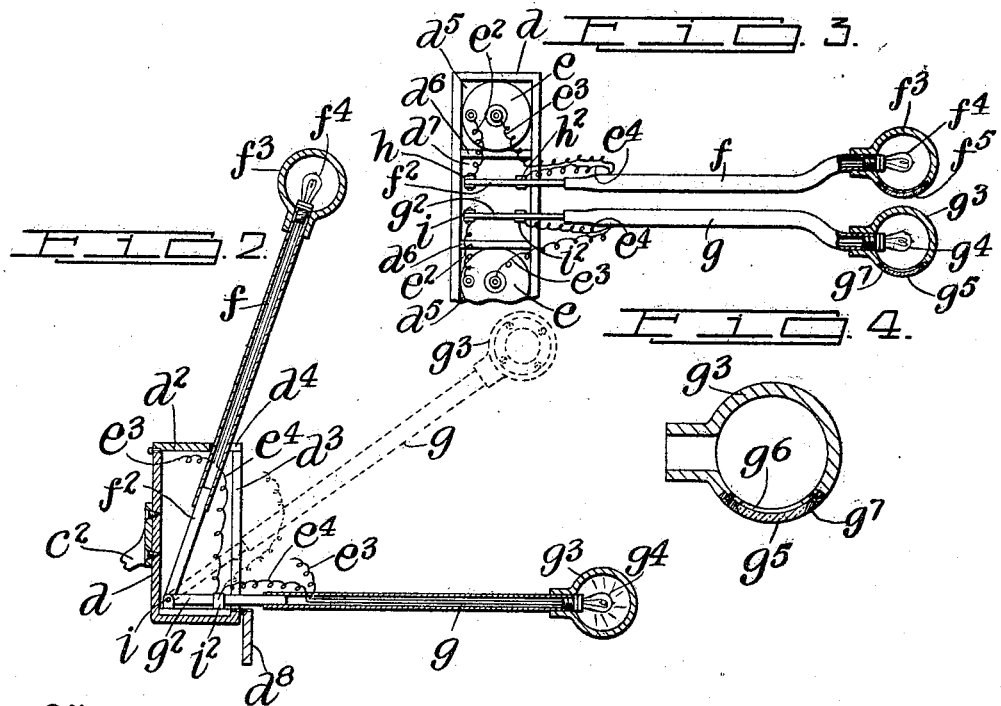
Witnesses:
Inventor
John J. Barrett,
By his Attorneys

UNITED STATES PATENT OFFICE.

JOHN J. BARRETT, OF MASPETH, NEW YORK.

TURNING-SIGNAL FOR AUTOMOBILES.

1,173,641.  Specification of Letters Patent.  Patented Feb. 29, 1916.

Application filed February 18, 1915.  Serial No. 9,172.

*To all whom it may concern:*

Be it known that I, JOHN J. BARRETT, a citizen of the United States, and residing at Maspeth, Long Island, in the county of Queens and State of New York, have invented certain new and useful Improvements in Turning-Signals for Automobiles, of which the following is a specification, such as will enable those skilled in the art to which it appertains to make and use the same.

This invention relates to what are known as turning signals for use by automobile drivers to indicate to the following vehicle his intention of making a turn so that the driver of the following vehicle will be on his guard, and the object of this invention is to provide an improved device or apparatus for this purpose by means of which the driver of an automobile may not only indicate to the driver of a following vehicle his intention of making a turn but also the direction in which the turn is to be made.

The invention is fully disclosed in the following specification, of which the accompanying drawing forms a part, in which the separate parts of my improvement are designated by suitable reference characters in each of the views, and in which:—

Figure 1 is a sectional view of the front part of the body of an automobile provided with my improvement and taken just in front of the seat of the driver; Fig. 2 a sectional view of my improved signal device or apparatus detached; Fig. 3 a plan view of said device or apparatus with part of the construction removed and part shown in section; and, Fig. 4 a sectional view of a signal ball which I employ, and two of which are provided.

In the drawing forming part of this specification, I have shown at $a$ a part of the front portion of the body of an automobile and at $b$ the steering tube which is stationary and with which the steering wheel $b^2$ is connected, said wheel being provided with a rod which passes down through the tube $b$, this construction being all of the well known form and constituting no part of my invention.

In the practice of my invention, as shown in the drawing, I secure to the tube $b$ a sleeve $c$ having an outwardly directed arm $c^2$ to which is secured a box $d$ having a hinged cover $d^2$ and the front of the box $d$ is provided with two vertical slots $d^3$ which extend into the cover $d^2$ as shown at $d^4$ in Fig. 2, and the box $d$ is provided at its opposite ends with separate compartments $d^5$ formed by transverse partitions $d^6$ and in which are placed batteries $e$, and said partitions also form in the central part of the box a chamber $d^7$. I also provide two arms $f$ and $g$ having shank portions $f^2$ and $g^2$ which are pivoted to supports $h$ and $i$ in the back portion of the chamber $d^7$, and in the front portion of said chamber are switch members $h^2$ and $i^2$ in connection with which the shanks $f^2$ and $g^2$ of the arms $f$ and $g$ operate.

The arms $f$ and $g$ and their shank portions $f^2$ and $g^2$ are adapted to swing vertically in the slots $d^3$ in the front of the box $d$, and the outer parts of said arms are tubular in form, in the construction shown, and are provided at their outer ends with hollow balls $f^3$ and $g^3$ in which are placed electric-light bulbs $f^4$ and $g^4$ which are secured to the ends of the arms $f$ and $g$, and the batteries $e$ are also provided with wires $e^2$ which are connected with the supports $h$ and $i$ to which the arms $f$ and $g$ are pivoted, and with other wires $e^3$, and connected with the switch members $h^2$ and $i^2$ are other wires $e^4$ and the wires $e^3$ and $e^4$ are passed into the tubular parts of the arms $g$ and $f$ and through said parts and connected with the bulbs $f^4$ and $g^4$.

The balls $f^3$ and $g^3$ on the outer ends of the arms $f$ and $g$ may be made of any suitable material, but are preferably made of non-breakable material and are colored respectively red and green, and the ball $f^3$ is provided in its rear side with a red transparent or translucent panel $f^5$, while the ball $g^3$ is provided in its rear side with a green transparent or translucent panel $g^5$, and in Fig. 4 I have shown one of said balls and the details of its construction, or the method of securing the transparent panel therein, in which operation the back of the ball is provided with a large circular aperture $g^6$ around which is secured a metal ring $g^7$ which holds the panel $g^5$ in position, and it will be understood that both of the balls $f^3$ and $g^3$ are made in the same manner.

The front of the box or case is also provided with a door $d^8$ which is hinged to the bottom portion thereof, and which is adapted to open downwardly, and this door when in its closed position covers the bottom portion of the slots $d^3$ in the front of said box and limits the downward movement of the arms $f$ and $g$, as indicated in dotted lines in Fig. 2, but when said door is open the said arms may be lowered into the horizontal position as indicated in Fig. 2, the arm $g$ being shown in a horizontal and operative position in full lines in said figure, and the arm $f$ being shown in a raised or inoperative position, and in said figure the arm $g$ is also shown in dotted lines in a partially raised position which position either of said arms may assume when the driver of a vehicle provided with my improved signaling device or apparatus desires to signal a following vehicle, or the driver thereof, in the day-time.

The operation will be readily understood from the foregoing description when taken in connection with the following statement. In the use of this device the door $d^8$ is closed in the day-time and if the driver of an automobile provided with this device or apparatus desires to signal the driver of a following vehicle that he intends to turn to the right, he lowers the arm $f$ into the position shown in dotted lines in Fig. 2, and the driver of the following vehicle understands the vehicle preceding him will turn to the right. If the driver of the first vehicle desires or intends to turn to the left, he lowers the arm $g$ into the position shown in dotted lines in Fig. 2, and the driver of the following vehicle understands that the preceding vehicle will turn to the left. In these operations, the shanks of the arms $f$ and $g$ do not come into connection with the switch devices or members $h^2$ and $i^2$ and the bulbs $f^4$ and $g^4$ are not operated or energized. If, however, the apparatus or device is used at night the door $d^8$ is turned down and this, in the above described operation of the arms $f$ and $g$ permits said arms to drop into the horizontal position in which the shanks $f^2$ and $g^2$ of the arms $f$ and $g$ come into contact with the switch devices or members $h^2$ and $i^2$ and the bulbs $f^4$ and $g^4$ are operated or actuated and a red or green light is shown in place of a red or green ball.

From the foregoing description it will be seen that with my improvement the driver of an automobile or other power driven vehicle may quickly and easily signal the driver of the following vehicle not only that he intends to make a turn but also the direction in which the turn is to be made, and while I have shown and described the preferred form and method of operating the various parts of my improved signal device or apparatus, my invention is not limited to the details thereof herein shown and described, and various modifications thereof may be made, within the scope of the appended claims, without departing from the spirit of my invention or sacrificing its advantages, and while I have also shown my improved signal device or apparatus connected with the steering post or tube $b$, my invention is not limited to this connection and the signal device or apparatus may be supported in any preferred manner adjacent to one side of the automobile body and where it may be conveniently operated by the driver of the automobile, or other vehicle.

Having fully described my invention, what I claim as new and desire to secure by Letters Patent is:—

1. A turning signal device for power driven vehicles comprising two arms pivoted in a box or casing supported adjacent to one side of the vehicle, said box or casing being adapted to support two batteries and being provided with two contact devices, said arms being adapted to swing into approximately vertical and horizontal positions and into engagement with said contact devices, said arms being tubular in form and provided at their outer ends with differently colored hollow balls having similarly colored transparent or translucent panels in one side thereof and in which are placed light bulbs which are secured in the ends of said tubular arms, circuit wires connected with the batteries and passing through said tubular arms to said bulbs and back to said contact devices, and from the batteries to the pivot of said arms whereby when said arms are in engagement with said contact devices said bulbs will be illuminated.

2. A turning signal device for vehicles comprising two arms pivotally supported adjacent to one side of the vehicle and adapted to be swung in a transverse vertical plane into different positions, said arms being provided at their outer ends with differently colored hollow members having similarly colored transparent or translucent panels in one side thereof and within which are placed light bulbs, means whereby in the horizontal position of said arms said bulbs will be illuminated, and means for supporting said arms at an angle of approximately thirty to forty degrees from a horizontal position.

In testimony that I claim the foregoing as my invention I have signed my name in presence of the subscribing witnesses this 15th day of February, 1915.

JOHN J. BARRETT.

Witnesses:
C. MULREANY,
H. E. THOMPSON.